(12) United States Patent
Macomber et al.

(10) Patent No.: US 12,537,814 B2
(45) Date of Patent: Jan. 27, 2026

(54) METHOD FOR GLOBAL IDENTITY VERIFICATION

(71) Applicant: Capital One Services, LLC, McLean, VA (US)

(72) Inventors: Jackson Macomber, Henrico, VA (US); Jeffrey Rule, Chevy Chase, MD (US); Lawrence Douglas, McLean, VA (US); Bob Uni Koshy, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 173 days.

(21) Appl. No.: 18/265,567

(22) PCT Filed: Mar. 1, 2023

(86) PCT No.: PCT/US2023/063494
§ 371 (c)(1),
(2) Date: Jun. 6, 2023

(87) PCT Pub. No.: WO2023/168279
PCT Pub. Date: Sep. 7, 2023

(65) Prior Publication Data
US 2024/0154952 A1 May 9, 2024

Related U.S. Application Data

(60) Provisional application No. 63/315,364, filed on Mar. 1, 2022.

(51) Int. Cl.
*H04L 29/06* (2006.01)
*H04L 9/40* (2022.01)

(52) U.S. Cl.
CPC .......... *H04L 63/083* (2013.01); *H04L 63/105* (2013.01)

(58) Field of Classification Search
CPC .............. H04L 63/083; H04L 63/105
See application file for complete search history.

(56) References Cited

U.S. PATENT DOCUMENTS

| | | |
|---|---|---|
| 7,325,128 B2 | 1/2008 | Wood et al. |
| 10,187,374 B2 | 1/2019 | Brannon |

(Continued)

OTHER PUBLICATIONS

Choudhry, Ruchir, "Biometrics for Global Web Authentication: an Open Source Java/J2EE-Based Approach", International Journal of Computer Theory and Engineering, vol. 3, No. 2, Apr. 2011, ISSN: 1793-8201, pp. 324-327.

(Continued)

*Primary Examiner* — Wasika Nipa
(74) *Attorney, Agent, or Firm* — Sterne, Kessler, Goldstein & Fox P.L.L.C.

(57) ABSTRACT

Disclosed herein are system, method, and computer readable media embodiments for global identity verification of a user for multiple services. In some embodiments, a centralized authentication platform (CAP) may receive a request from an independent service to generate an authentication token for a client device based on authentication performed by the service. The CAP may generate an authentication token of a particular authorization level, based on the method of authentication used by the service. The CAP may send the token to the client device as well as store the token in a database. The CAP may receive a second request from a second, unrelated service to validate the authentication token on the client device. The CAP may validate the token on the client device against the token in the database based on an authentication level thereof, and send a response to the second service indicating token validity.

18 Claims, 8 Drawing Sheets

(56) References Cited

U.S. PATENT DOCUMENTS

| | | |
|---|---|---|
| 2011/0022835 A1 | 1/2011 | Schibuk |
| 2015/0180870 A1 | 6/2015 | Zhang et al. |
| 2016/0283737 A1 | 9/2016 | Soman et al. |
| 2017/0170963 A1* | 6/2017 | Xu ..................... H04L 63/0807 |
| 2019/0363886 A1 | 11/2019 | Atwood et al. |
| 2019/0372786 A1* | 12/2019 | Ra .......................... G06F 21/30 |
| 2020/0019714 A1 | 1/2020 | Schnjakin et al. |
| 2021/0084024 A1 | 3/2021 | Sadayoshi et al. |
| 2021/0090074 A1 | 3/2021 | Powell et al. |
| 2021/0272083 A1 | 9/2021 | Phillips et al. |

OTHER PUBLICATIONS

International Search Report and Written Opinion directed to related application No. PCT/US2023/063494, mailed Sep. 7, 2023, 11 pages.

\* cited by examiner

METHOD FOR GLOBAL IDENTITY VERIFICATION

CROSS-REFERENCE TO RELATED APPLICATIONS

This application claims the benefit of U.S. Provisional Application No. 63/315,364, filed Mar. 1, 2022, the disclosure of which is incorporated by reference herein in its entirety.

BACKGROUND

Over the course of a day, a user of mobile banking, ecommerce, and other online services is required to verify their identity numerous times through a variety of authentication processes in order to access their various accounts. This can become tedious and cumbersome, particularly when multifactor authentication is required.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
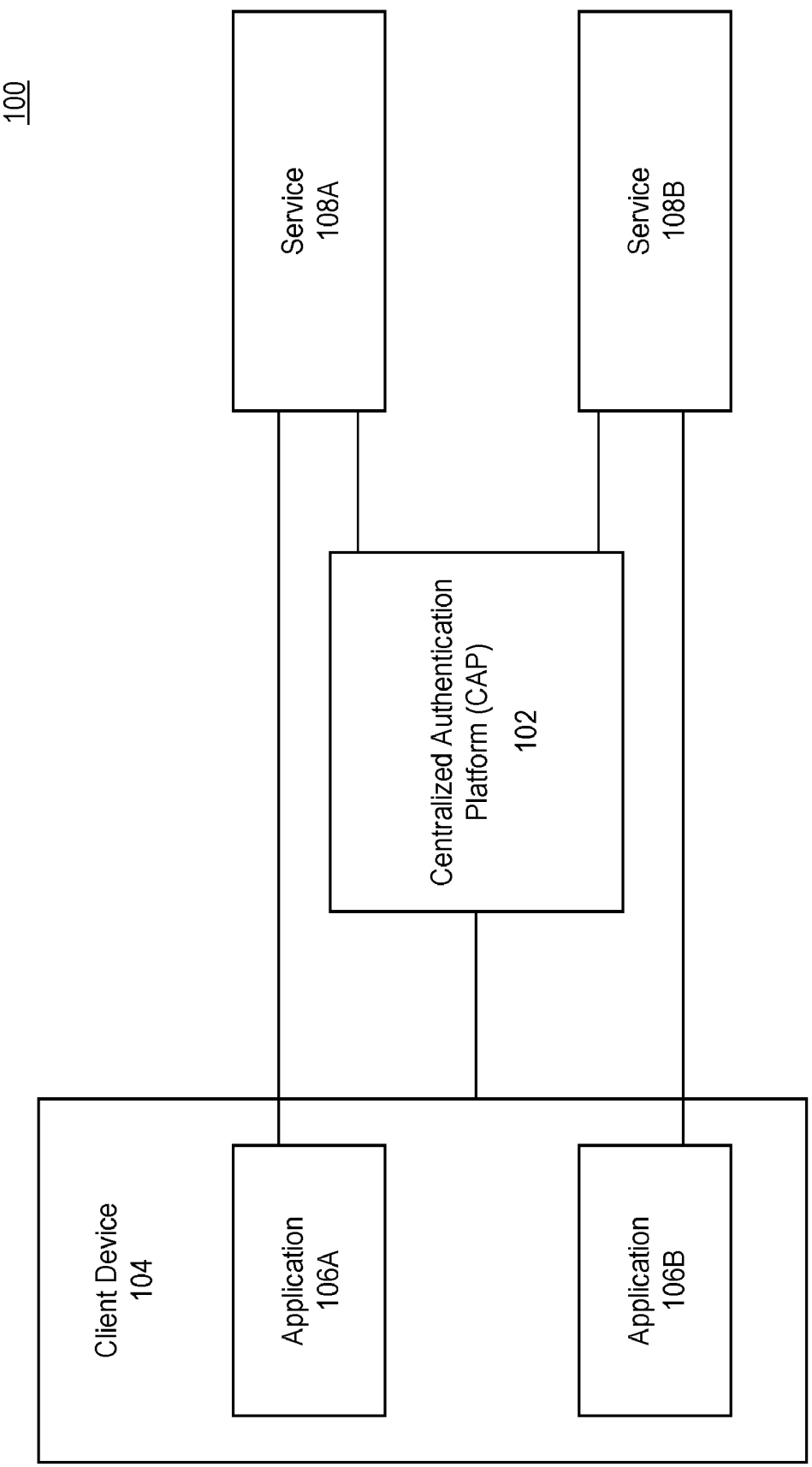
FIG. 1 is a block diagram illustrating an example system for global identity verification, in accordance with some embodiments.

Provided herein are system, method, and/or computer program product embodiments, and/or combinations and sub-combinations thereof, for global identity verification of a user through authentication via a centralized authentication platform (CAP), which allows authentication by a qualifying service to be trusted by other services.

Each day, users perform numerous multi-factor authentication challenges in order to access their most sensitive personal information (e.g., files, bank data, personal information, etc.). Using a CAP as disclosed herein, a user may be authenticated by a qualifying service such that the authentication is available to be trusted by other services. Qualifying authentication may be provided from, for example and without limitation, a bank, a mobile device, a merchant, a social network, etc. Examples of qualifying authentication methods include, without limitation, bank login information, biometrics (e.g., fingerprint identification, voice detection, and/or face identification), partner identification platforms, on-device application linking, personal identification number (PIN) code, card verification value (CVV) number, and geolocation of residence and/or known device.

Once a user is authenticated using one of these methods in a qualifying service, their device may be granted a unique and time bound token that allows the user to authenticate into device-based applications, software applications, and other digital experiences without having to perform a subsequent login with associated multi-factor authentication. This may be useful for frequently-accessed services where credentialing slows down the provision of information to the user and presents a barrier to entry, such as with banking applications (which require the user to login and overcome a multi-factor authentication challenge to gain access to personal data, transaction and payment records, and payment credentials), bundled services (such as applications that provide secure access to email, photos, digital wallets, and other specialized applications that require web and device-based authentication with multi-factor authentication), purpose-built services (where best-in-class services that provide users access to documents, file sharing, photo storage, and payment credentials require an elevated level of authentication to access the data), device authentication (which often requires use of a fingerprint, voice, facial recognition, etc. that is uniquely owned and/or associated with an individual user), and third-party authentication services (such as services that specialize in providing users security and authentication to validate that a user is who they claim to be).

Once a user successfully authenticates with one qualifying service, thus producing an authentication token, embodiments described herein allow other services to validate that the token is active and authenticated. In this way, embodiments described herein provide assurance that the user is who they claim to be. With this confidence, services, such as software applications and digital experiences, may allow a user unencumbered access to services including banking, payment provisioning, social media, online merchant checkout, application-based merchant checkout, device-based applications, and device settings.

In embodiments, participating services submit for and receive authorization of device tokens through the CAP. The CAP is responsible for creating, storing, managing, and controlling tokens. In some embodiments, services are able to generate a token by submitting a request; if the request is granted, the platform returns an authenticated token to a secure location on the user device that can be accessed by other services. Tokens may be generated in tiers based on the level of authentication used to generate the token. Tokens with the highest tier of authentication are able to access a user's most valuable and private information (such as social security number, credit card number, bank account number, etc.), whereas tokens below the highest tier may allow access to less sensitive information (such as photos, card-on-file checkout, social media, etc.).

Services requesting creation of a token must indicate the method(s) used to authenticate a user. The CAP then determines what tier level the token is associated with. Should a participating service require a higher level token than what is currently available, the user will have to pass a higher level (i.e., more secure) authentication process with the participating service; upon success, the token may then be updated to the new, higher token tier.

For example, in some embodiments, the CAP may receive a request from a participating service to generate an authentication token for a client device based on an authentication performed by the service. The request may be prompted by a user attempting to access a user account through the participating service. The request may include a unique device ID for the client device and a method of authentication used to authenticate the user. Upon receiving the request, the CAP may determine an authorization level corresponding to the method of authentication, and generate an authentication token for the client device based on the authorization level. The CAP may additionally generate token information for the authentication token, the token information comprising a token ID, method of authentication, and authorization level provided by the token. The CAP may store the device ID, authentication token, and token information in a database. The CAP may also send the authentication token to the client device. The CAP may send a response to the requesting service indicating that an authentication token has been generated for the client device. Upon receiving an indication that an authentication token has been generated for the client device, the service may send a response to the client device indicating that the user has been authenticated and granted access to the user account.

Embodiments herein shall be described with reference to applications running on the client device. However, a person of skill in the art will appreciate that a similar authentication process would be used for secure websites accessed through a browser or networks requiring a login.

FIG. 1 illustrates a system for global identity verification, in accordance with some embodiments.

In some embodiments, system 100 may include centralized authentication platform (CAP) 102, client device 104 on which applications 106 can be accessed, and services 108. CAP 102 may be an authentication platform responsible for generating, storing, and managing authentication tokens for a plurality of services 108. Services 108 may be online services managed by entities (e.g., banking institutions, merchants, social media networks, etc.) that provide applications 106 through which users can access services 108. In some embodiments, services 108 are separate online services managed by unrelated entities. Services 108 may manage user accounts for a wide range of users. Examples of applications 106 may include mobile, web, desktop, and/or cross-platform applications. In some embodiments, CAP 102 is controlled separately (i.e., is independent) from any one of services 108. In some embodiments, CAP 102 shares control with one or more of services 108, while also being independent from one or more other of services 108. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Services 108 may be configured to require authentication of users before granting access to user accounts via applications 106. Accordingly, services 108 may use CAP 102 to facilitate authentication of users in order to provide a better user experience, by reducing the number of times users have to go through authentication processes while still maintaining the same level of security. CAP 102 is further described below with respect to FIG. 8.

In some embodiments, client device 104 may be a user's personal device (e.g., smart phone, tablet, laptop, etc.) and have applications 106 (such as 106A and 106B) installed on it. The user may use applications 106 to access services 108 and perform tasks such as view their user accounts, perform transactions, view/update personal information, etc. For example, application 106A may be a mobile ecommerce application managed by service 108A. Service 108A may be an online merchant. The user may have an account with service 108A and use application 106A to access their account and perform a variety of transactions (e.g., make purchases, view order history, track orders, make returns, etc.).

Application 106A may be configured to send a request to service 108A before allowing the user to access their user account and any associated information (e.g., order history, payment information, etc.). The request may include a unique device ID for client device 104 and a flag indicating whether an authentication token from CAP 102 exists on client device 104. Upon receiving the request from application 106A, service 108A may determine, based on the flag, that no authentication token from CAP 102 exists on client device 104. Service 108A may then send a response to application 106A indicating that user authentication is required. The response may include instructions for application 106A to display a login screen to the user. The login screen may instruct the user to provide the credentials necessary for authentication. For example, service 108A may require the user to authenticate by providing the username and password associated with their account in order to access their account. In some embodiments, service 108A may require different methods of authentication to be used for different types of tasks and/or transactions. For example, service 108A may require authentication via username and password login to view their account information, such as their shipping address and order history. However, service 108A may require multifactor authentication for transactions that require a higher level of security such as making purchases and viewing/editing payment information.

Upon receiving the necessary credentials, service 108A may authenticate the user, verifying their identity. Service 108A may send a request to CAP 102 to generate an authentication token to be used by the user on client device 104. The request may include the device ID for client device 104 and the method of authentication used to authenticate the user on client device 104.

Figure 8:
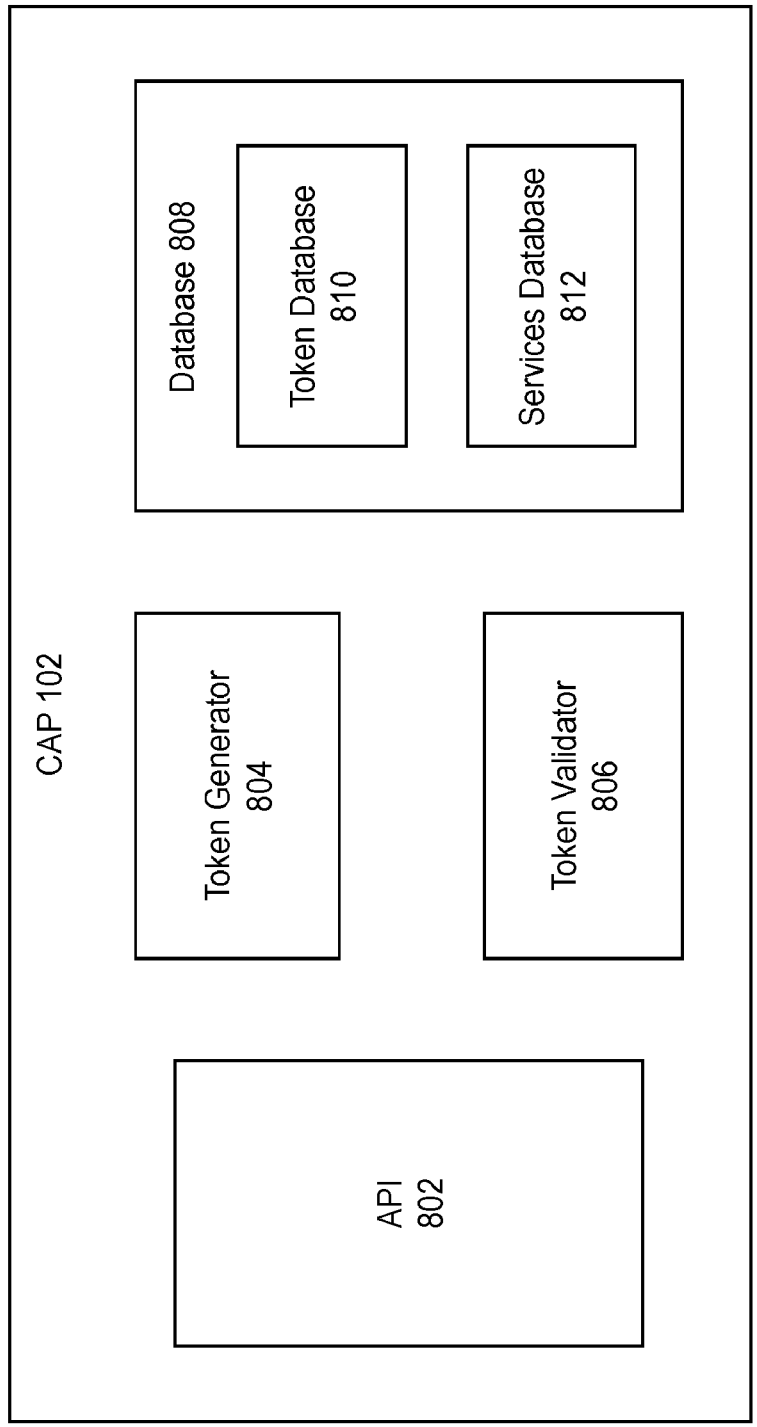
FIG. 8 is a block diagram illustrating an example centralized authentication platform, in accordance with some embodiments.

In some embodiments, CAP 102 may be configured to generate authentication tokens of different authorization tiers based on the method of authentication. As illustrated in FIG. 8, CAP 102 may include an application programming interface (API) 802, a token generator 804, a token validator 806, and a database 808. Database 808 may be organized so as to maintain a token database 810 and a services database 812. Token database 810 and services database 812 may be stored in database 808 as separate entities, or they may simply represent different filters or viewpoints into database 808. The elements of CAP 102 may be co-located or distributed across a cloud network. The elements of CAP 102 can be connected through wired connections, wireless connections, or a combination of wired and wireless connections.

API 802 may be an interface configured to communicate with one or more services 108 and applications 106 executing on one or more client devices 104. Token generator 804 may include a set of software instructions executed by a processing device of CAP 102 to generate a unique token corresponding to a particular device ID. Once generated by token generator 804, a token is stored in token database 810, along with token information (e.g., metadata). The token information may include, for example, the device ID, a generation timestamp, and an authentication level and/or method of authentication associated with the token.

Information on services 108 whose authentication procedures involve CAP 102 is stored in services database 812. Services database 812 may include rules associated with a corresponding service 108, such as a token expiration time and a level of authentication required for one or more actions (e.g., transaction types) associated with the corresponding service 108. Such rules in services database 812 may be received during an onboarding procedure that sets up a given service 108 for use with CAP 102, and/or such rules may be received along with a specific request from a service 108. Token validator 806 may include a set of software instructions executed by a processing device of CAP 102 to determine whether a particular token meets the authentication requirements of the requesting service 108 when a user of the device corresponding to the particular token interacts with the service 108.

If a service 108 is identified in services database 812 as having multiple transaction types, each transaction type may be associated with a particular expiration time and required authentication level. In some embodiments, two or more transaction types have different required authentication levels, but share the same expiration time. In some embodiments, two or more transaction types of different expiration times, but share the same required authentication level. In some embodiments, two or more transaction types may share the same expiration time and the same required authentication level. In this way, services database 812 of CAP 102 maintains a list of transaction types and corresponding expiration time periods and/or authorization levels required to perform transactions categorized under each transaction type.

When a request is received by CAP 102 via API 802 for which no current token information exists in token database 810, CAP 102 may first validate that the method of authentication provided by service 108A in the request is a qualifying authentication method according to rules for the service received with the request and/or stored in services database 812. Qualifying authentication methods may include username and password login, biometrics, PIN code, physical security key, etc. CAP 102 may then use the authentication method to determine a level of authorization based on the level of security the authentication method provides. For example, authentication via a four-digit code may be assigned a low authorization level, as a four-digit code can be easily stolen or guessed by brute force and thus provides minimal security. Conversely, multifactor authentication methods may be assigned the highest authorization levels as they provide the highest levels of security. The username and password login method used by service 108A may be assigned an authorization level that corresponds to a midlevel of security.

Upon determining the authorization level, CAP 102 may generate an authentication token based on the level of authorization, and send the authentication token to client device 104. For example, token generator 804 of CAP 102 may generate the authentication token, and send the authentication token to client device 104 via API 802. Additionally, CAP 102 may store a copy of the token in secure token database 810 along with the device ID for client device 104. CAP 102 may also store token information associated with the authentication token in token database 810. The token information may include, for example, a token ID, the authorization level, and a timestamp indicating when the token was created. CAP 102 may send a response to service 108A indicating that an authentication token has been generated based on the authentication performed by service 108A and sent to client device 104. Accordingly, service 108A may allow the user to access the user account using application 106A on client device 104.

The user may then open application 106B on client device 104. Application 106B may be a mobile banking application corresponding to service 108B, which may be an online banking service managed by a financial institution. As such, application 106B may be configured to check if there is an authentication token from CAP 102 stored on client device 104 and send a request to service 108B. The request may comprise the device ID for client device 104 and an indication that an authentication token from CAP 102 exists on client device 104.

Service 108B may require authentication of the user in order to allow application 106B access to the user's banking information. Service 108B may be a participating service that uses CAP 102 to facilitate authentication of users and their devices. Accordingly, upon receiving the request from application 106B, service 108B may send a request to CAP 102 to validate the authentication token on client device 104 and verify the identity of the user based on the authentication token. The request to CAP 102 to validate the token on client device 104 may include the device ID for client device 104.

In some embodiments, token database 810 on CAP 102 includes a copy of the authentication token stored on client device 104. As such, CAP 102 may validate the authentication token for client device 104 against the request from service 108B. CAP 102 may identify the authentication token for client device 104 in the token database using the unique device ID provided in the request from service 108B. CAP 102 may determine that the authentication token for client device 104 in the token database is valid in accordance with rules for service 108B stored in services database 812. In some embodiments, where CAP 102 also has access to the token stored on client device 104, CAP 102 may compare a token ID value for the authentication token on client device 104 with that of the token in the database to determine a match.

Additionally, validation of the authentication token corresponding to client device 104 may include determining that the token is still active and has not expired. In some embodiments, service 108B may determine an expiration time after which an authentication token is no longer valid for use with service 108B (i.e., token expiration time). The token expiration time set by service 108B may be based on the authorization level of the authentication token. Alternatively, the token expiration time may be based on the level of authorization required by service 108B for the task the user is attempting to perform in application 106B.

For example, as noted above, application 106B may be a mobile banking application and the request sent from application 106B to service 108B is for access to view the user's banking information on initial load of application 106B. As such, service 108B may only require a valid token with an authorization level equal to that of a username and password login. Therefore, the service 108B may indicate to CAP 102 (either at the time of request or based on rules stored in services database 812) that an authentication token must be created within a certain time period (e.g. 48 hours) of the request to validate the token for the token to be trusted by service 108B.

In some embodiments, service 108B may indicate the token expiration time in the request to CAP 102 to validate the authentication token on client device 104. CAP 102 may then determine that the authentication token for client device 104 is valid for authenticating the user with service 108B based on the token expiration time from the request and the timestamp indicating when the token was created.

Alternatively, CAP 102 may maintain in services database 812 a record comprising token expiration times for each participating service based on the token authorization level. CAP 102 may then retrieve the token expiration time data corresponding to service 108B and the authorization level of the authentication token from services database 812.

Upon determining that the authentication token on client device 104 is active and valid for authenticating the user for service 108B, CAP 102 may send a response to service 108B indicating that the authentication token on client device 104 is valid. Additionally, the response may include the authorization level of the authentication token. Service 108B may determine that the authorization level is sufficient for viewing the user's banking information and allow access to the user to view their banking information in application 106B on client device 104.

Figure 2:
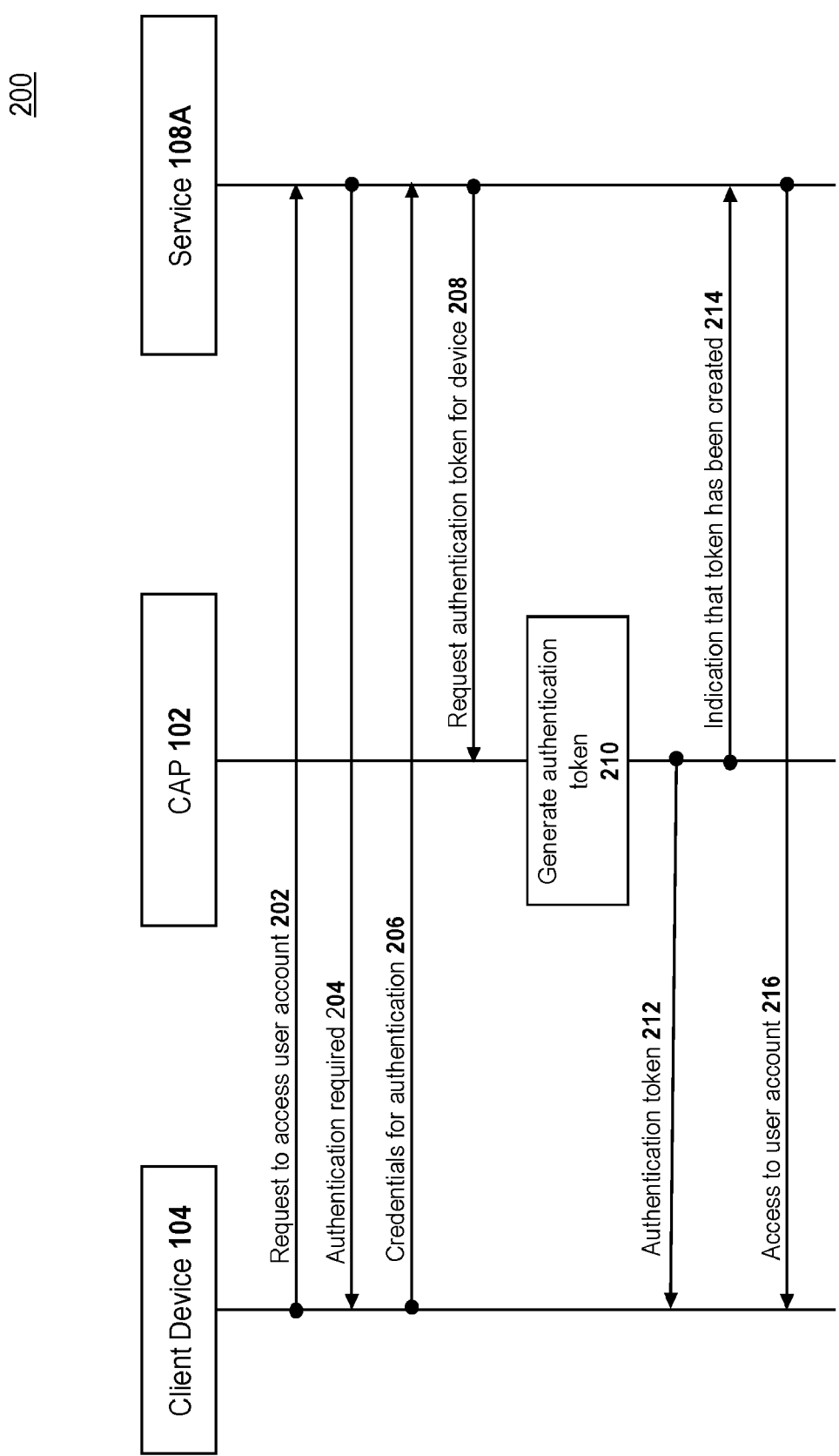
FIG. 2 is a sequence diagram illustrating a process for authenticating a user with a participating service using a centralized authentication platform, in accordance with some embodiments.

FIG. 2 illustrates a process 200 for authenticating a user with a participating service using a centralized authentication platform (e.g., CAP 102) when no valid token exists on the user device, in accordance with some embodiments. Process 200 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in FIG. 2 may not need to be performed in the exact order shown, as will be understood by a person of ordinary skill in the art. Accordingly, the scope of the invention should not be considered limited to the specific arrangement of steps shown in FIG. 2.

Process 200 shall be described with reference to FIG. 1. However, process 200 is not limited to that example embodiment.

At 202, application 106A installed on client device 104 may send a request to access a user account to service 108A. The request may include a unique device ID for client device 104. In some embodiments, if the user has not previously logged in to their account with service 108A using application 106A on client device 104, then no user account may be associated with client device 104. Accordingly, the user maybe required to log in to their account and authenticate with service 108A using application 106A.

At 204, service 108A may send a response to application 106A on client device 104 indicating authentication is required to access the user account. The response may include an instruction to provide user credentials for the authentication. Upon receiving the response, application 106A may be configured to display, on client device 104, a UI element prompting the user to enter user credentials for the user account they wish to access. The UI element may be a login page with input fields in which the user may enter a username and password associated with their user account with service 108A.

At 206, application 106A on client device 104 may send the user credentials provided by the user to service 108A. Service 108A may authenticate the user and client device 104 using the credentials provided. In some embodiments, application 106A may also send, along with the user credentials, a flag indicating that client device 104 is the user's personal device and thus the device ID for client device 104 may be linked with the user account upon authentication. Accordingly, service 108A may update the user account information to include the unique device ID for client device 104 allowing service 108A to identify the user account using the device ID for subsequent requests to access the user account using client device 104.

At 208, upon authenticating the user and client device 104, service 108A may send a request to CAP 102 to generate an authentication token for client device 104 based on the authentication. The request may include the device ID for client device 104, an indication that successful authentication of user and client device 104 has been performed by service 108A, and the method of authentication used. For example, the method of authentication may be a username and password login for the authentication described above. However, service 108A may have used any one or more of several qualifying authentication methods to authenticate the user and client device 104. Examples of qualifying authentication methods may include, but are not limited to, biometric scans (e.g., fingerprint scan, facial recognition, and retina scan), PIN code, geolocation, voice detection, and physical security key. In some embodiments, the request may also include the username and/or email associated with the user's account with service 108A. In embodiments, only an indication that authentication was successful may be sent by service 108A to CAP 102 along with an identification of the method of authentication used, so that the actual username and password login information is not shared with CAP 102. In this way, service 108A may maintain security over the actual username and password login information.

At 210, CAP 102 may determine an authorization level for client device 104 based on the authentication method used to authenticate client device 104. The authorization level may correspond with the level of security provided by the authentication method. For example, multi-factor authentication methods may be assigned a high authorization level, while low-security, single-factor authentication methods such as PIN code and geolocation may be assigned a low authorization level.

CAP 102 may generate an authentication token for client device 104 based on the authorization level of client device 104. CAP 102 may store the authorization token for client device 104 in secure token database 810, along with the device ID for client device 104 and the token information associated with the generated token. The token information may include, for example, a token ID, authorization level, and a timestamp indicating when the token was created. In some embodiments, the token information may also include the username and/or email associated with the user account.

At 212, CAP 102 may send the authentication token to client device 104. Client device 104 may store the authentication token in a secure location on the device fully accessible only to CAP 102. Applications 106 may have access to detect whether or not an authentication token exists in the storage location. However, only CAP 102 may have read and write permissions for the storage location of the authentication token on client device 104.

At 214, CAP 102 may send a response to service 108A indicating that an authentication token has been generated for client device 104 and is valid for the user.

At 216, service 108A may send an indication to application 106A on client device 104 that successful authentication of the user and client device 104 has been performed, allowing the user to access their account on client device 104 using application 106A.

Figure 3:
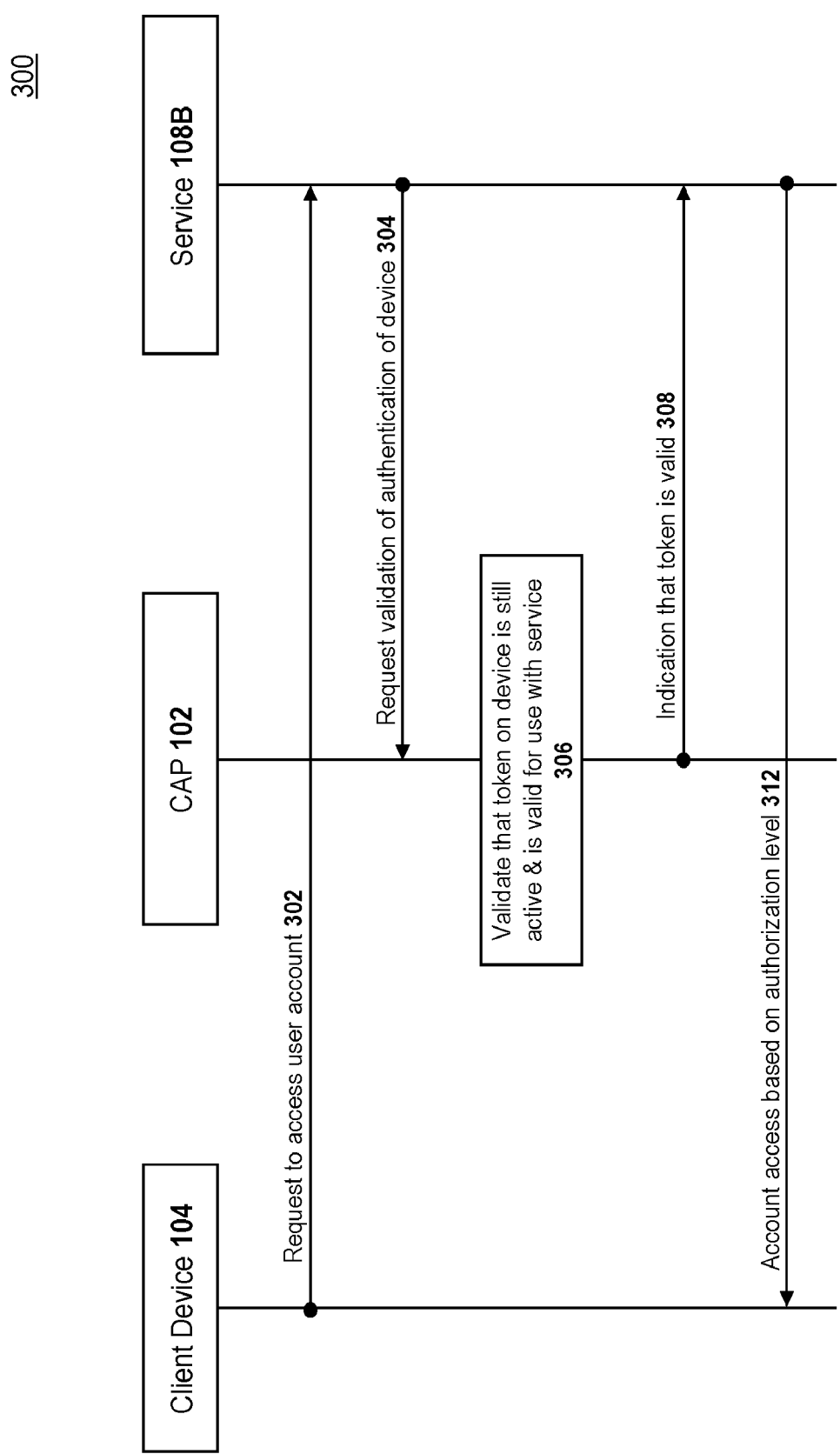
FIG. 3 is a sequence diagram illustrating a process for validating authentication of a user for a participating service using a centralized authentication platform, in accordance with some embodiments.

FIG. 3 illustrates a process 300 for validating authentication of a user for a participating service using a centralized authentication platform (e.g., CAP 102) when a token has previously been generated for the user device, in accordance with some embodiments. Process 300 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in FIG. 3 may not need to be performed in the exact order shown, as will be understood by a person of ordinary skill in the art. Accordingly, the scope of the invention should not be considered limited to the specific arrangement of steps shown in FIG. 3.

Process 300 shall be described with reference to FIG. 1. However, process 300 is not limited to that example embodiment.

At 302, application 106B installed on client device 104 may send a request to access a user account to service 108B. The request may include the device ID for client device 104 and an indication that an authentication token generated by CAP 102 exists on client device 104. In some embodiments, client device 104 may be the user's personal device and thus associated with a particular user account for the user. As such, service 108B may use the device ID for client device 104 to identify the user account associated with client device 104.

However, if client device 104 is associated with more than one user account for service 108B, application 106B may be configured to display a UI element prompting the user to select the account they would like to access before sending a request to service 108B. The UI element may display a list comprising a username (or other identifier) for each account associated with client device 104. Each username may be a selectable element. Upon selection of a username associated with the particular user account for which the user desires to request access, application 106B may send a request to service 108B to access the selected user account. The request may include the device ID for client device 104 and the username associated with the user account for which the application 106B is requesting access.

At 304, service 108B may send a request to CAP 102 to validate the authentication token stored on client device 104. The request may include the device ID for client device 104. In some embodiments, the request may also include a time period for which the authentication token is to be considered active by service 108B. For example, service 108B may trust authentication of a user on client device 104 for 48 hours. As such, if the authentication token on the client device was generated more 48 hours prior to the request to validate the token, the authentication token is no longer valid for service 108B. Accordingly, the user will be required to re-authenticate on client device 104 in order to gain access to the user account. In some embodiments, the request need not include the time period because such information is already present in services database 812.

In some embodiments, the request sent from service 108B to CAP 102 in 304 may also include the type of transaction requested by client device 104 (in this example, accessing an account) and/or a level of security required for service 108B.

At 306, CAP 102 may identify and retrieve, from the token database, the authentication token for client device 104 using the device ID. CAP 102 may also retrieve the authentication token stored on client device 104. CAP 102 may then validate that the authentication token on the client device is valid by matching the authentication token stored on client device 104 to the authentication token for client device 104 retrieved from token database 810.

In some embodiments, client device 104 may be associated with two or more user accounts maintained by service 108B. As such, service 108B may need to ensure that the authentication token is valid for authentication of the correct user account. Accordingly, service 108B may include, in the request to CAP 102 to validate the authentication token stored on client device 104, the username/email (or other account-identifying information) of the account for which service 108B is requesting validation of the token. In this scenario, CAP 102 may use the username/email for the user account in addition to the device ID to identify and retrieve the authentication token for client device 104 from the token database.

In some embodiments, CAP 102 may determine an expiration date and time for the authentication token based on the token creation timestamp in the token information and the token expiration time for service 108B. CAP 102 may then validate that the authentication token is still active and has not expired. In some embodiments, CAP 102 may also determine whether an authorization level of the authentication token for client device 104 is equal to or greater than the authorization level required for the type of transaction being requested (in this example, accessing an account). For example, if the token was generated based on high level method of authentication, and the action requested by a device requires a high or low level method of authentication, then the authentication token would be valid for the action. CAP 102 thus may then validate that the authentication token is valid for use with service 108B. In another example, if the token was generated based on a low level method of authentication (e.g., PIN), and the action requested by the device requires a high level method of authentication (e.g., multi-factor authentication), then the authentication token would not be valid for the action. CAP 102 may then determine that the authentication token is not valid for use with service 108B.

CAP 102 may make this determination of validity based on information received from service 108B in request 304, rules stored in services database 812, or a combination thereof. For example, if the request sent in 304 includes a transaction type being requested, CAP 102 may retrieve, from services database 812, the corresponding authorization level and/or expiration time needed for that transaction type at service 108B. In some embodiments, the request sent in 304 may contain no information regarding the authorization level or transaction type, such that CAP 102 simply consults database 812 to determine a minimum authorization level needed for service 108B. In some embodiments, the request sent in 304 explicitly includes the authorization level and/or expiration time needed by service 108B, in which case CAP 102 may not need to consult services database 112.

At 308, CAP 102 may send a response to service 108B indicating that the authentication token on client device 104 is valid for authenticating the user and client device for service 108B.

At 312, service 108B may grant permission to access the user account using application 106B on client device 104 based on validation of the authentication token on client device 104.

Figure 4:
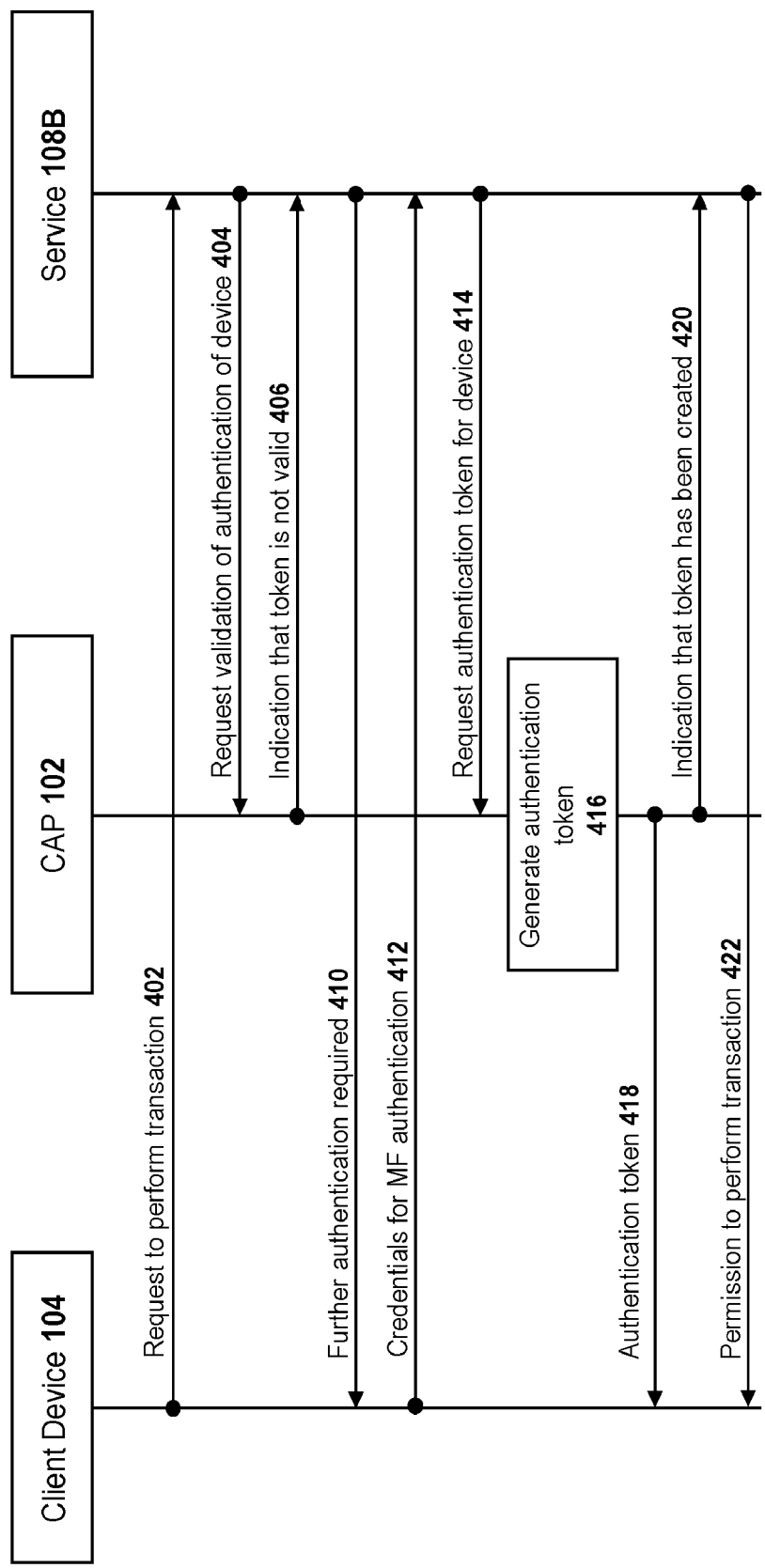
FIG. 4 is a sequence diagram illustrating a process for re-authenticating a user with a participating service using a centralized authentication platform, in accordance with some embodiments.

FIG. 4 illustrates a sequence diagram illustrating a process for re-authenticating a user with a participating service using a centralized authentication platform (e.g., CAP 102) when a previously-generated token is insufficient for the level of service requested, in accordance with some embodiments. Process 400 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in FIG. 4 may not need to be performed in the exact order shown, as will be understood by a person of ordinary skill in the art. Accordingly, the scope of the invention should not be considered limited to the specific arrangement of steps shown in FIG. 4.

Process 400 shall be described with reference to FIG. 1. However, process 400 is not limited to that example embodiment.

At 402, application 106B on client device 104 may send a request to service 108B to perform a transaction. The request may include the device ID for client device 104 and an indication that an authentication token generated by CAP 102 exists on client device 104. In some embodiments, service 108B may use the device ID for client device 104 to identify the user account associated with client device 104.

At 404, service 108B may send a request to CAP 102 to validate the authentication token stored on client device 104. The request may include the device ID for client device 104. In some embodiments, the request may also include a required authorization level and/or transaction type, a token expiration time, and/or the username/email of the user account for which service 108B is requesting validation of the authorization token.

CAP 102 may determine that the authorization level of the authentication token for client device 104 is lower than the authorization level required to perform the transaction. For example, service 108B may be an online banking service and the user may have requested to make a transfer to an external account. Service 108B may require an authorization level corresponding to a multifactor authentication method to perform transactions that require transfers to external accounts. However, the authorization level of the authentication token for client device 104 may correspond to a username and password login method of authentication. As such, service 108B may require further authentication of the user and client device 104 via multifactor authentication in order to allow the user to perform the transaction.

Accordingly, at 406, CAP 102 may send a response to service 108B indicating that the authentication token on client device 104 is not valid for authenticating the user and client device for service 108B.

At 410, service 108B may send a response to application 106B on client device 104 indicating that further authentication is required to perform the transaction. The response may include instructions for a multifactor authentication process. Application 106B may be configured to display, on client device 104, a UI element that provides instructions/steps to the user for performing the required multifactor authentication. In some embodiments, the UI element may provide input fields for user credentials and/or onetime passwords which the user may retrieve, for example, via an authenticator application, keyfob, or SMS.

At 412, application 106B may send the information (e.g., credentials) provided by the user, based on the instructions for the multifactor authentication process from service 108B, to service 108B. Service 108B may successfully authenticate the user and client device based on the information from application 106B.

At 414, service 108B may send a request to CAP 102 to generate an authentication token for client device 104 based on the multifactor authentication. The request may include the device ID for client device 104, an indication of successful authentication of user and client device 104, and the method of authentication used for the authentication. In some embodiments, the request may also include the username and/or email associated with the user's account with service 108B.

At 416, CAP 102 may determine an updated authorization level for client device 104 based on the multifactor authentication method used to authenticate client device 104. CAP 102 may generate a new authentication token for client device 104 based on the updated authorization level. CAP 102 may replace the existing authentication token and token information for client device 104 in the token database with the newly generated authentication token and token information.

At 418, CAP 102 may send the newly generated authentication token to client device 104. Upon receiving the new token, client device 104 may replace the existing authentication token with the new authentication token from CAP 102.

At 420, CAP 102 may send a response to service 108B indicating that a new authentication token has been generated for client device 104 based on the multifactor authentication performed by service 108B.

At 422, service 108B may send an indication to application 106B on client device 104 that successful authentication of the user and client device 104 has been completed, allowing the user to proceed with performing the transaction on client device 104 using application 106B.

Figure 5:
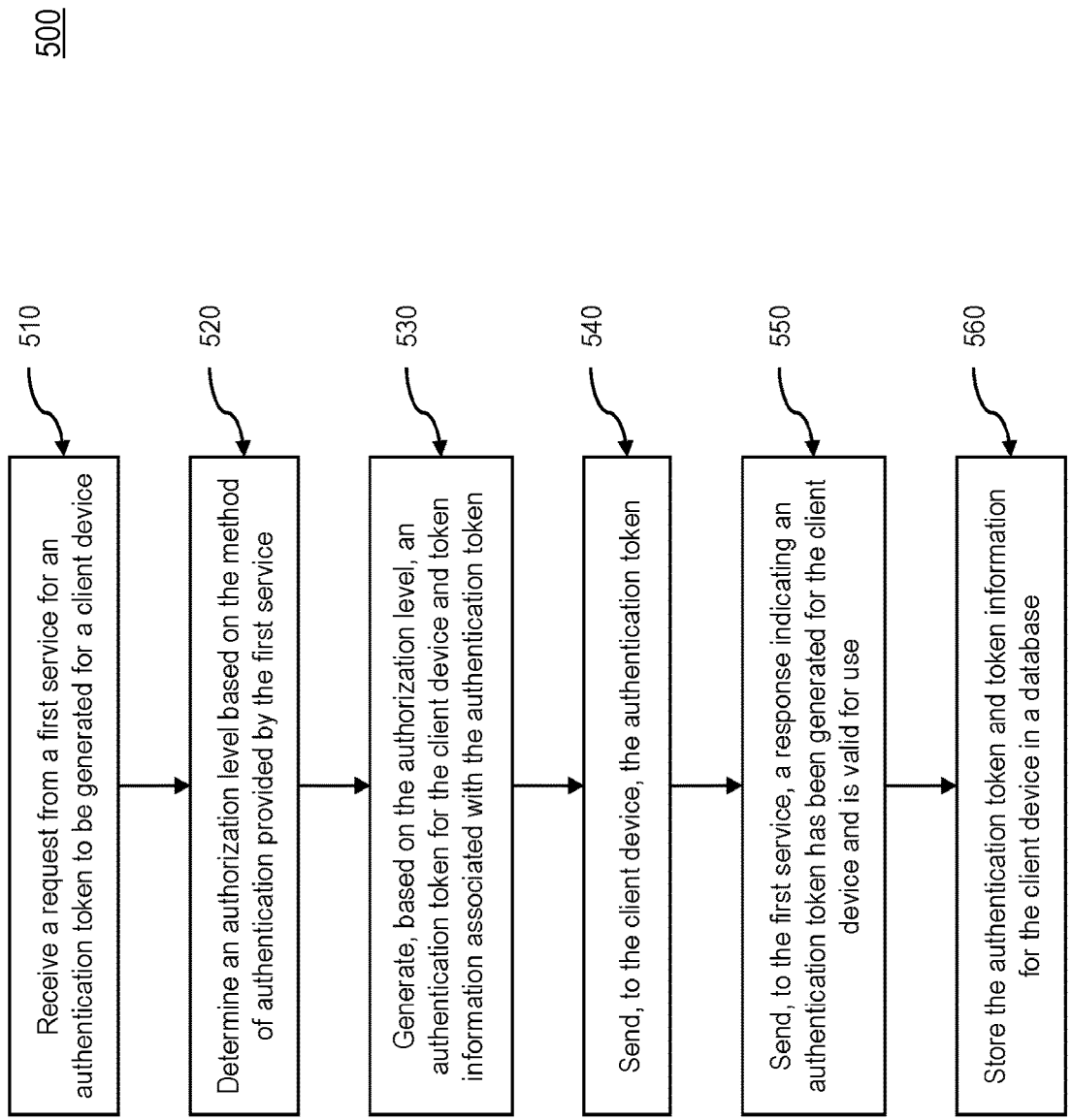
FIG. 5 is a flowchart illustrating an example method for authenticating a user with a participating service using a centralized authentication platform, in accordance with some embodiments.
Figure 6:
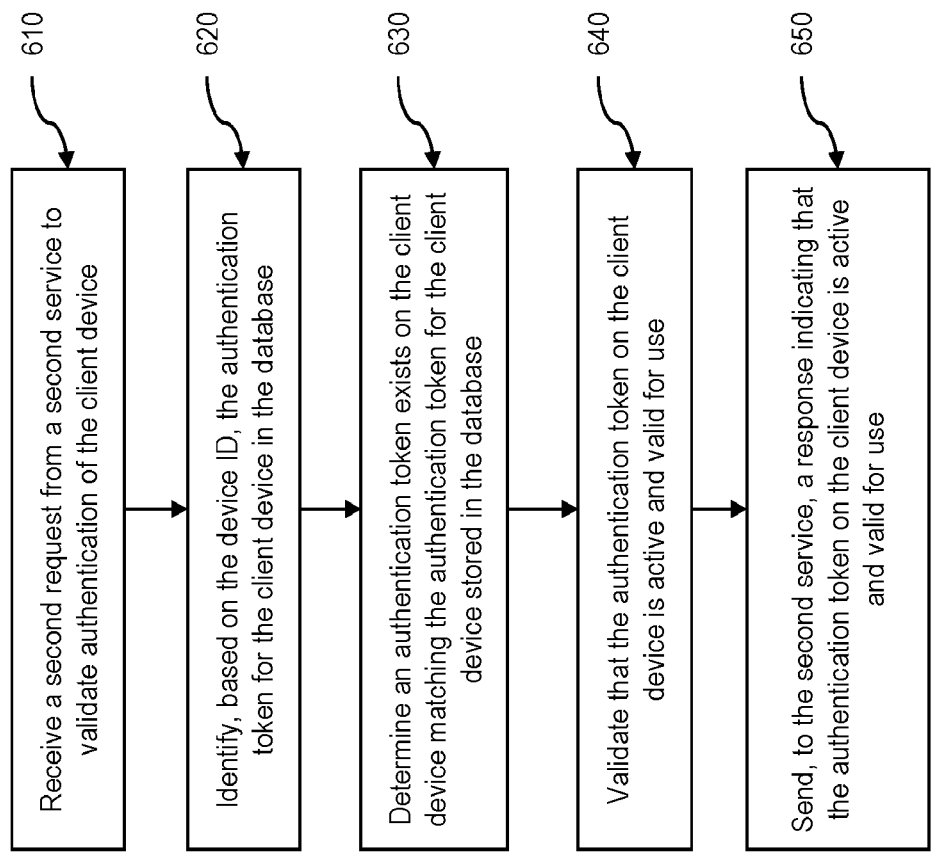
FIG. 6 is a flowchart illustrating an example method for validating authentication of a user for a participating service using a centralized authentication platform, in accordance with some embodiments.

FIGS. 5 and 6 illustrate methods 500 and 600 for authenticating a user with and validating authentication of a user for a participating service using a centralized authentication platform (e.g., CAP 102), in accordance with some embodiments. Methods 500 and 600 may be performed by processing logic that may include hardware (e.g., circuitry, dedicated logic, programmable logic, microcode, etc.), software (e.g., instructions executing on a processing device), or a combination thereof. In some embodiments, some steps in FIGS. 5 and 6 may not need to be performed in the exact order shown, as will be understood by a person of ordinary skill in the art. Accordingly, the scope of the invention should not be considered limited to the specific arrangement of steps shown in FIGS. 5 and 6.

Referring now to FIG. 5, method 500 shall be described with reference to FIG. 1. However, method 500 is not limited to those example embodiments.

In 510, CAP 102 may receive a request from a service 108A for an authentication token to be generated for client device 104 based on authentication of the client device performed by service 108A. The request may include an indication of successful authentication, a unique device ID for client device 104, and a qualifying method of authentication. The method of authentication may be the method by which the user and client device 104 was authenticated by service 108A.

In 520, CAP 102 may determine an authorization level for the authentication of the user and client device 104 based on the method of authentication provided in the request. The authorization level may correspond to the level of security provided by the authentication method.

In 530, CAP 102 may generate an authentication token for client device 104 based on the authentication of the user and client device 104 performed by service 108A. The authentication token may be assigned the authorization level determined by CAP 102 in 520. As such, the newly generated authentication token may be used to authenticate the user and client device 104 with other participating services requiring an authorization level lower than or equal to the authorization level assigned to the token.

In addition to the authentication token, CAP 102 may also generate token information associated with the authentication token for client device 104. The token information may include the authorization level of the token, a token ID, and a timestamp indicating the date and time when the token was generated.

In 540, CAP 102 may send the authentication token to client device 104 over a secure connection. Upon receiving the authentication token, client device 104 may verify that the authentication token was sent by CAP 102 and store the token in a secure location. CAP 102 may have read and write permissions for the authentication token storage location on client device 104, while participating services may have limited read permission that allows services to simply detect the presence of a token.

In 550, CAP 102 may send a response to service 108A. The response may indicate that an authentication token for client device 104 has been generated and sent to client device 104.

In 560, CAP 102 may store the authentication token for client device 104 and associated token information in a secure token database, such as token database 810. The token database may be a searchable database such that CAP 102 may search for and retrieve authentication tokens for a given client device using the client device ID.

Referring now to FIG. 6, method 600 shall be described with reference to FIG. 1. However, method 600 is not limited to those example embodiments.

In 610, CAP 102 may receive a request from service 108B to validate authentication of client device 104 based on the authentication token stored on client device 104. The request may include the device ID for client device 104. In some embodiments, the request may also include a required authorization level and/or a transaction type, a token expiration time, and/or an email/username associated with the user for which service 108B requires authentication. In some embodiments, the required authorization level and/or the token expiration time are stored at and retrieved from CAP 102's services database 812 such that they do not need to be included in each individual request from service 108B. The request to CAP 102 may have been sent by service 108B in response to receiving a separate request from client device 104 to access a user account maintained by service 108B using application 106B.

In 620, CAP 102 may query the token database using the device ID provided in the request and retrieve the authentication token for client device 104. In some embodiments, CAP 102 may query the token database using both the device ID and email/username. This may be useful if the user has multiple accounts with a participating service and uses client device 104 to log into two or more of those accounts.

In 630, CAP 102 may communicate with client device 104 to determine that an authentication token exists on the device and validate the token against the authentication token for client device 104 retrieved from the token database. Validation of the authentication token on client device 104 may include may include determining that it matches the authentication token retrieved from the token database.

In 640, CAP 102 may use the timestamp in the token information indicating when the authentication token for client device 104 was generated and the token expiration time for service 108B, to determine that the authentication token is active and has not expired. As described above, the token expiration time for service 108B may be included in the request to validate authentication of client device 104. Alternatively, the token expiration times for participating services may be stored in a database (separate from the token database) and retrieved by CAP 102 using a service ID unique to each participating service. Additionally, CAP 102 may use the required authorization level to determine that the authorization level for the token on client device 104 is equal to or greater than the authorization level required to perform the requested type of transaction (e.g., access a user account). Having determined that the authorization level is sufficient, CAP 102 may determine that the authentication token stored on client device 104 is valid for use with service 108B.

In 650, CAP 102 may send, to service 108B, a response indicating that the authentication token stored on client device 104 is active and valid for authentication of the user and client device with service 108B. Service 108B may grant permission to client device 104 to access the user account using application 106B.

Figure 7:
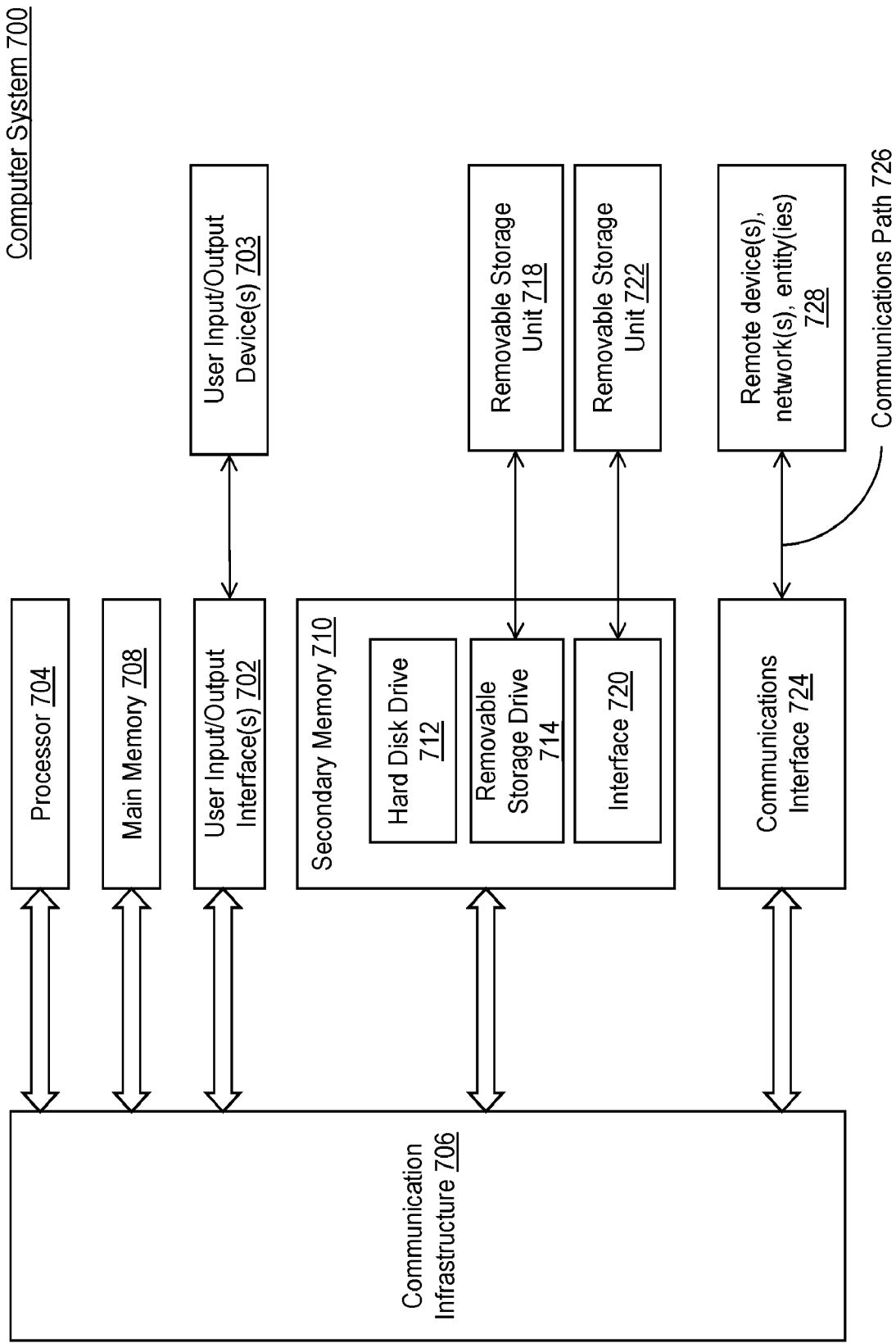
FIG. 7 is an example computer system useful for implementing various embodiments.

Various embodiments may be implemented, for example, using one or more well-known computer systems, such as a computer system 700, as shown in FIG. 7. One or more computer systems 700 may be used, for example, to implement any of the embodiments discussed herein, as well as combinations and sub-combinations thereof. The computer systems 700 may be used for the implementation of one or more embodiments described above.

The computer system 700 may include one or more processors (also called central processing units, or CPUs), such as a processor 704. The processor 704 may be connected to a communication infrastructure or bus 706.

The computer system 700 may also include user input/output device(s) 703, such as monitors, keyboards, pointing devices, etc., which may communicate with communication infrastructure 706 through user input/output interface(s) 702.

One or more processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 700 may also include a main or primary memory 708, such as random access memory (RAM). Main memory 708 may include one or more levels of cache. Main memory 708 may have stored therein control logic (i.e., computer software) and/or data.

The computer system 700 may also include one or more secondary storage devices or memory 710. The secondary memory 710 may include, for example, a hard disk drive 712 and/or a removable storage device or drive 714. The removable storage drive 714 may be a floppy disk drive, a magnetic tape drive, a compact disk drive, an optical storage device, tape backup device, and/or any other storage device or storage drive.

The removable storage drive 714 may interact with a removable storage unit 718. The removable storage unit 718 may include a computer-usable or readable storage device having stored thereon computer software (control logic) and/or data. The removable storage unit 718 may be a floppy disk, magnetic tape, compact disk, DVD, optical storage disk, and/any other computer data storage device. The removable storage drive 714 may read from and/or write to the removable storage unit 718.

The secondary memory 710 may include other means, devices, components, instrumentalities, or other approaches for allowing computer programs and/or other instructions and/or data to be accessed by the computer system 700. Such means, devices, components, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 700 may further include a communication or network interface 724. The communication interface 724 may enable the computer system 700 to communicate and interact with any combination of external devices, external networks, external entities, etc. (individually and collectively referenced by reference number 728). For example, the communication interface 724 may allow the computer system 700 to communicate with the external or remote devices 728 over communications path 726, which may be wired and/or wireless (or a combination thereof), and which may include any combination of LANs, WANs, the Internet, etc. Control logic and/or data may be transmitted to and from the computer system 700 via the communication path 726.

The computer system 700 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 700, the main memory 708, the secondary memory 710, and the removable storage units 718 and 722, as well as tangible articles of manufacture embodying any combination of the foregoing. Such control logic, when executed by one or more data processing devices (such as the computer system 700), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 6. In particular, embodiments can operate with software, hardware, and/or operating system implementations other than those described herein.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A computer-implemented method, comprising:
receiving, by one or more computing devices from a first service, a first request for an authentication token to be generated for a client device to perform one or more transactions, wherein the first request comprises a unique device identifier for the client device, an indication of successful authentication of the client device by the first service, and a method of authentication, and wherein the one or more transactions includes a first transaction of a first transaction type;

determining, by the one or more computing devices, an authorization level based on the method of authentication provided by the first service;

determining, by the one or more computing devices, based on the authorization level, a first duration of time for which authentication of the client device is trusted, wherein the first duration of time is associated with the first transaction type;

generating, by the one or more computing devices, based on the authorization level, the authentication token for the client device and token information associated with the authentication token, wherein the token information comprises the authorization level for the authentication token and a timestamp indicating when the client device was authenticated, and wherein the authentication token is active based on the timestamp and the first duration of time;

sending, by the one or more computing devices to the client device, the authentication token;

sending, by the one or more computing devices to the first service, a response indicating the authentication token has been generated for the client device and is valid for use;

storing, by the one or more computing devices, the authentication token and token information for the client device in a token database;

receiving, by the one or more computing devices, from a second service, a second request to validate authentication of the client device, the second request comprising: the unique device identifier of the client device; a second transaction type for which validation of the client device is required; and an indication that the authentication token is present on the client device;

validating, by the one or more computing devices and based on the unique device identifier for the client device, that the authentication token present on the client device is active and valid for performing a transaction of the second transaction type included in the second request, wherein the authentication token present on the client device matches the authentication token stored in the token database; and sending, by the one or more computing devices to the second service, a second response indicating that the authentication token on the client device is active and valid for use.

2. The computer-implemented method of claim 1, wherein the method of authentication used to authenticate the client device with the first service is a username and password login.

3. The computer-implemented method of claim 1, wherein the token information further comprises a token ID.

4. The computer-implemented method of claim 1, wherein the first service is an online merchant.

5. The computer-implemented method of claim 1, wherein the second service is an online banking service.

6. The computer-implemented method of claim 1, wherein validating that the authentication token on the client device is active and valid for performing the transaction of the second type comprises:

retrieving, by the one or more computing devices, from a services database, data for the second service comprising a second authorization level required for the second transaction type indicated in the second request and a second duration of time for which authentication of the client device is trusted for the second transaction type;

determining, by the one or more computing devices, that the authorization level of the authentication token on the client device is equal to or greater than the second authorization level required for the second transaction type; and determining, by the one or more computing devices, based on the timestamp indicating when the client device was authenticated and the first duration of time for which authentication of the client device is trusted for the first transaction type, that authentication of the client device has not expired.

7. The computer-implemented method of claim 6, wherein the second transaction type indicated in the second request is one of multiple transaction types for the second service, and wherein each transaction type has a corresponding authorization level that is required to perform corresponding a transaction categorized under that transaction type.

8. The computer-implemented method of claim 1, further comprising:

receiving, by the one or more computing devices from the second service, a third request to validate authentication of the client device, wherein the third request includes the unique device identifier for the client device and a third transaction type;

validating, by the one or more computing devices, that the authentication token on the client device is not valid for use to perform a transaction of the third transaction type;

sending, by the one or more computing devices to the second service, a response indicating that the authentication token on the client device is not valid for use to perform the transaction of the third transaction type;

receiving, by the one or more computing devices from the second service, a fourth request for a new authentication token to be generated for the client device, wherein the fourth request comprises the unique device identifier for the client device, an second indication of successful authentication of the client device by the second service, and a second method of authentication;

determining, by the one or more computing devices, a second authorization level based on the second method of authentication provided by the second service;

generating, by the one or more computing devices, based on the second authorization level, a second authentication token for the client device and a second set of token information associated with the second authentication token, wherein the second set of token information comprises the second authorization level for the second authentication token;

sending, by the one or more computing devices to the client device, the second authentication token;

sending, by the one or more computing devices to the first service, a response indicating the second authentication token has been generated for the client device and is valid for use; and replacing, by the one or more computing devices, the authentication token and token information for the client device stored in the token database with the second authentication token and the second set of token information for the client device.

9. The computer-implemented method of claim 8, wherein the second method of authentication used to authenticate the client device with the second service comprises two-factor authentication.

10. A method, comprising:

accessing, by a client device, a first application corresponding to a first service, wherein the first application is configured to require authentication of the client device to access a user account managed by the first service, and wherein accessing a user account corresponds to a first transaction type;

sending, by the client device to the first service, a first request to access the user account managed by the first service, wherein the first request includes a unique device identifier for the client device;

receiving, by the client device from the first service, an indication that authentication of the client device is required and an instruction to provide credentials for the authentication, wherein the instruction corresponds to a method of authentication;

upon receiving the instruction, providing, by the client device to the first service, credentials necessary for the authentication;

receiving, by the client device from a centralized authentication platform, based on authentication of the client device performed by the first service, an authentication token, wherein the authentication token corresponds to a timestamp indicating when the client device was authenticated and an authorization level associated with the method of authentication, wherein the authentication token is active based on the timestamp and a first duration of time for which authentication of the client device is trusted, and wherein the duration of time is associated with the first transaction type;

receiving, by the client device from the first service, the indication that the client device has been authenticated and can access the user account managed by the first service via the first application;

accessing, by the client device, a second application corresponding to a second service, wherein the second application is configured to require authentication of the client device to access a second user account managed by the second service;

sending, by the client device to the second service, a second request to access the second user account managed by the second service, wherein the second request comprises the unique device identifier for the client device and the indication that the authentication token generated by the centralized authentication platform is present on the client device; and receiving, by the client device from the second service, permission to access the second user account managed by the second service based on authentication of the client device performed by the first service and the authentication token present on the client device matching an authentication stored in a token database of the centralized authentication platform.

11. A computer-implemented method, comprising:

receiving, by one or more computing devices from a client device, a first request to access a user account, wherein the first request includes a unique device identifier for the client device;

sending, by the one or more computing devices to the client device, an indication that authentication of the client device is required to grant the client device access to the user account and an instruction for the client device to provide credentials for the authentication;

receiving, by the one or more computing devices from the client device, authentication credentials for the client device;

authenticating, by the one or more computing devices, the client device based on the authentication credentials for the client device;

sending, by the one or more computing devices to a centralized authentication platform, a second request for an authentication token to be generated for the client device, wherein the second request comprises the unique device identifier for the client device, a first transaction type corresponding to accessing the user account, an indication of successful authentication of the client device, and a method of authentication used to authenticate the client device;

receiving, by the one or more computing devices from the centralized authentication platform, a second response indicating the authentication token has been generated for the client device and is valid for use, wherein the authentication token corresponds to a timestamp indicating when the client device was authenticated and an authorization level associated with the method of authentication, and wherein the authentication token is active based on the timestamp and a first duration of time for which authentication of the client device is trusted, and wherein the first duration of time is associated with the first transaction type;

sending, by the one or more computing devices to the client device, a second indication that the client device has been authenticated, allowing the client device to access the user account via a first application;

receiving, by the one or more computing devices from the client device, a third request to access a second user account, wherein the third request includes the unique device identifier of the client device and a third indication that the authentication token generated by the centralized authentication platform is present on the client device;

sending, by the one or more computing devices to the centralized authentication platform, a fourth request, wherein the fourth request includes the unique device identifier for the client device, a second transaction type corresponding to accessing the second user account, and the third indication;

receiving, by the one or more computing devices from the centralized authentication platform, a second response indicating that the authentication token present on the client device is active and valid for performing a transaction of the second transaction type, wherein the authentication token present on the client device matches the authentication token stored in a token database of the centralized authentication platform; and sending, by the one or more computing devices to the client device, permission to access the second user account based on the response indicating that the authentication token present on the client device is active and valid for use.

12. A computer-implemented method, comprising:

receiving, by one or more computing devices from a client device, a first request to access a user account, wherein the first request comprises a unique device identifier for the client device and an indication that an authentication token generated by a centralized authentication platform is present on the client device;

sending, by the one or more computing devices to the centralized authentication platform, a second request to validate authentication of the client device, wherein the second request includes the unique device identifier for the client device, the indication, and a first transaction type corresponding to accessing the user account;

receiving, by the one or more computing devices from the centralized authentication platform, a second indication that the authentication token on the client is active and valid for performing a first transaction corresponding to the first transaction type, wherein the first transaction type is associated with a first duration of time for which authentication of the client device is trusted, wherein the authentication token corresponds to a timestamp indicating when the client device was authenticated and an authorization level associated with a method of authentication used to authenticate the client device, and wherein the authentication token is active based on the first duration of time and the timestamp; and granting, by the one or more computing devices to the client device, based on the second indication, access to the user account.

13. The computer-implemented method of claim 12, wherein the centralized authentication platform maintains a list of transaction types and corresponding authorization levels required to perform transactions categorized under each transaction type.

14. The computer-implemented method of claim 13, wherein the centralized authentication platform determines the authentication token on the client device is valid by comparing the authorization level of the authentication token on the client device and a second authorization level required for the first transaction type in the second request.

15. The computer-implemented method of claim 12, wherein the authorization level of the client device corresponds to a username and password login authentication method.

16. The computer-implemented method of claim 12, further comprising:
receiving, by the one or more computing devices from the client device, a third request to perform a second transaction requiring a third authorization level corresponding to a multifactor authentication method;
sending, by the one or more computing devices to the centralized authentication platform, a fourth request to validate authentication of the client device, wherein the fourth request includes the unique device identifier for the client device and the second transaction type corresponding to the second transaction requested in the third request;
receiving, by the one or more computing devices from the centralized authentication platform, a third indication that the authentication token on the client device is not valid for use to perform the second transaction corresponding to the second transaction type;
determining, by the one or more computing devices, based on the third indication, that further authentication of the client device is needed to perform the second transaction;
sending, by the one or more computing devices to the client device, a response indicating that further authentication of the client device is required to perform the second transaction;
authenticating, by the one or more computing devices, the client device using a multifactor authentication process;
sending, by the one or more computing devices to the centralized authentication platform, a fifth request for a new authentication token to be generated for the client device, the fifth request comprising the unique device identifier for the client device, the indication of successful authentication of the client device, and the method of authentication used to authenticate the client device, wherein the method of authentication is multifactor authentication;
receiving, by the one or more computing devices from the centralized authentication platform, a second response indicating the new authentication token has been generated for the client device and is valid for use; and
sending, by the one or more computing devices to the client device, an indication that the client device has been authenticated using the multifactor authentication process, allowing the client device to perform the second transaction.

17. The computer-implemented method of claim 16, wherein the authorization level of the authentication token on the client device corresponds to a username and password login authentication method.

18. The computer-implemented method of claim 16, further comprising:
receiving, by the one or more computing devices from the client device, a sixth request to perform a third transaction;
sending, by the one or more computing devices to the centralized authentication platform, a seventh request to validate authentication of the client device, wherein the seventh request includes the unique device identifier for the client device and the third transaction type;
receiving, by the one or more computing devices from the centralized authentication platform, a fourth indication that authentication of the client device has expired; and
determining, by the one or more computing devices, based on the fourth indication, that further authentication of the client device is needed to perform the third transaction.

* * * * *